Figure 1:
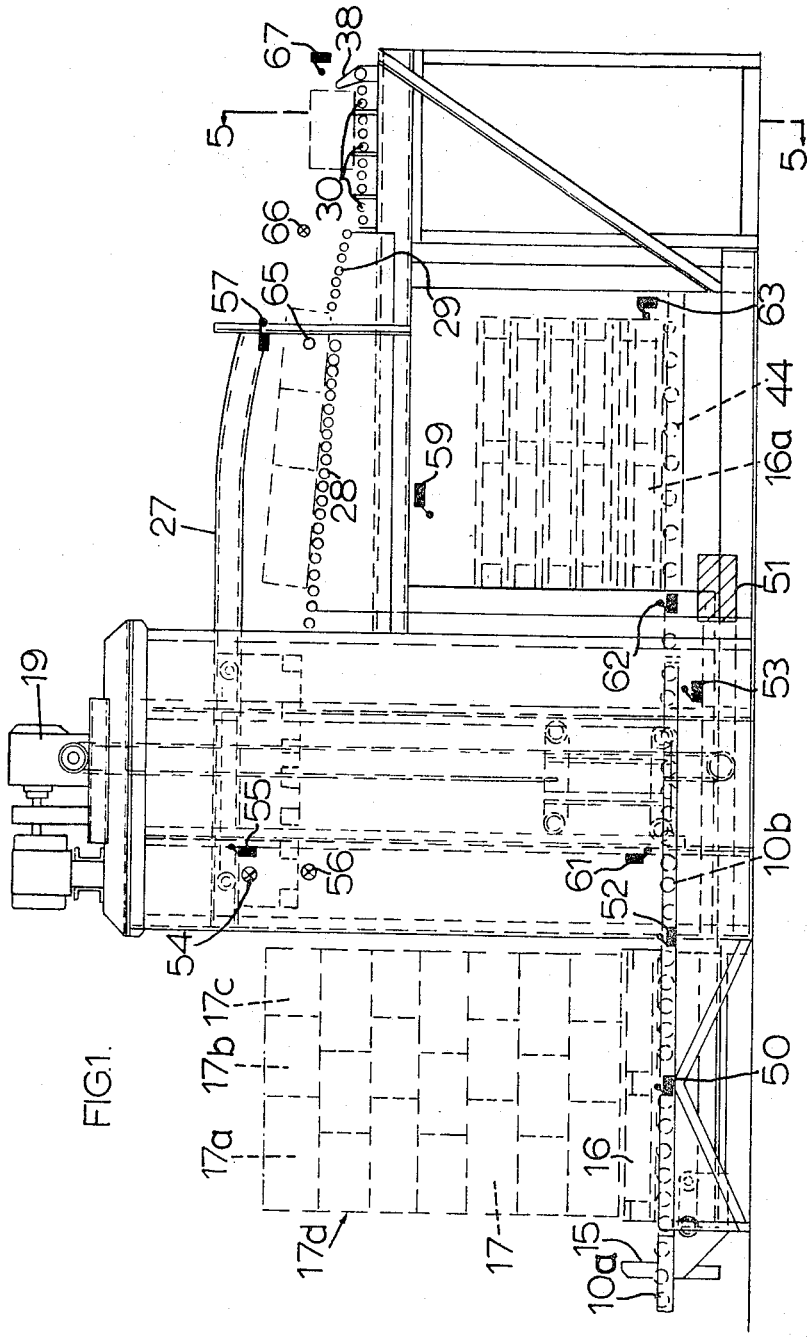

United States Patent Office 3,342,349
Patented Sept. 19, 1967

3,342,349
MECHANICAL HANDLING EQUIPMENT
Francis Duncan Sheldon and Charles Alan North, Tividale, Tipton, England, assignors to The Lawrence Engineering Company Limited, Tividale, Tipton, England, a British company
Filed May 25, 1965, Ser. No. 458,667
7 Claims. (Cl. 214—8.5)

This invention relates to mechanical handling equipment, and in particular to the handling of pallets loaded with a plurality of boxes, crates, parcels, or other articles.

In factories, warehouses and the like there is often the necessity of unloading palleted loads. For example, stacks of bottle crates may be transported on pallets and require to be unloaded so as to travel in single or other file along a conveyor for emptying and/or refilling.

There have been many prior proposals of pallet loading and unloading machines, but hitherto these have either had means for lowering the pallet so as to bring successive top layers below a pusher which displaces (i.e. slides) a fresh top layer onto the previous top layer or onto the pallet, as the case may be, or alternatively the pallet has remained stationary whilst a clamp has been lowered to deposit a layer on the top layer or on the pallet as the case may be. The first of these systems is unsatisfactory with many types of articles, and the second tends to create a very complex machine because of the provision for displacing the clamp both vertically and horizontally as well as operating the clamp itself.

The present invention seeks to provide improved equipment particularly for pallet unloading.

In accordance with the invention, mechanical handling equipment for unloading pallets comprises means for raising and lowering the loaded pallet so that the successive layers of articles on the pallet are raised to the same height on successive operational cycles, means for clamping the top layer of articles, and means for transferring the said top layer of articles to a discharge conveyor after the clamping is effected, and after the pallet and any other layers thereon have been lowered.

The clamp means may be used to suspend a layer or layers whilst a conveyor section is interposed below them (the pallet and other layers being lowered for this purpose) and the clamp is then released to lower the layers on to the conveyor: alternatively the clamp means may be mounted on a reciprocable trolley for transferring a clamped layer or layers to a conveyor, release, and return (empty) for the next load; in this latter case the trolley may be raised to lift the layers off the remaining ones or the pallet and other layers may be lowered to the same effect.

The equipment may be provided with limit switches operated by movements of the parts or articles, and/or with photoelectric cells energised and deenergised by movement of the parts or articles, so that a complete cycle may be repeated until the pallet is empty.

The pallet will normally be raised to a new and successively higher level at the commencement of each cycle, until the pallet is empty, when a switch or cell initiates a separate cycle lowering the pallet to a final position which may correspond to an initial position.

The equipment may include a pallet feed mechanism adapted to transfer a loaded pallet to a position, for example, below the clamp means, corresponding to said initial position, and this may serve to displace the preceding and emptied pallet into a pallet magazine.

The features of the pallet magazine are described in our co-pending application for Letters Patent Serial No. 458,670 (filing date May 25, 1965).

The layers of articles released from the pallets may be moved along a conveyor and the arrangement of this to ensure a regular spaced convoy of articles disposed in like relation to the conveyor sides is described in our co-pending application for Letters Patent Serial No. 458,666 (filing date May 25, 1965).

Figure 2:
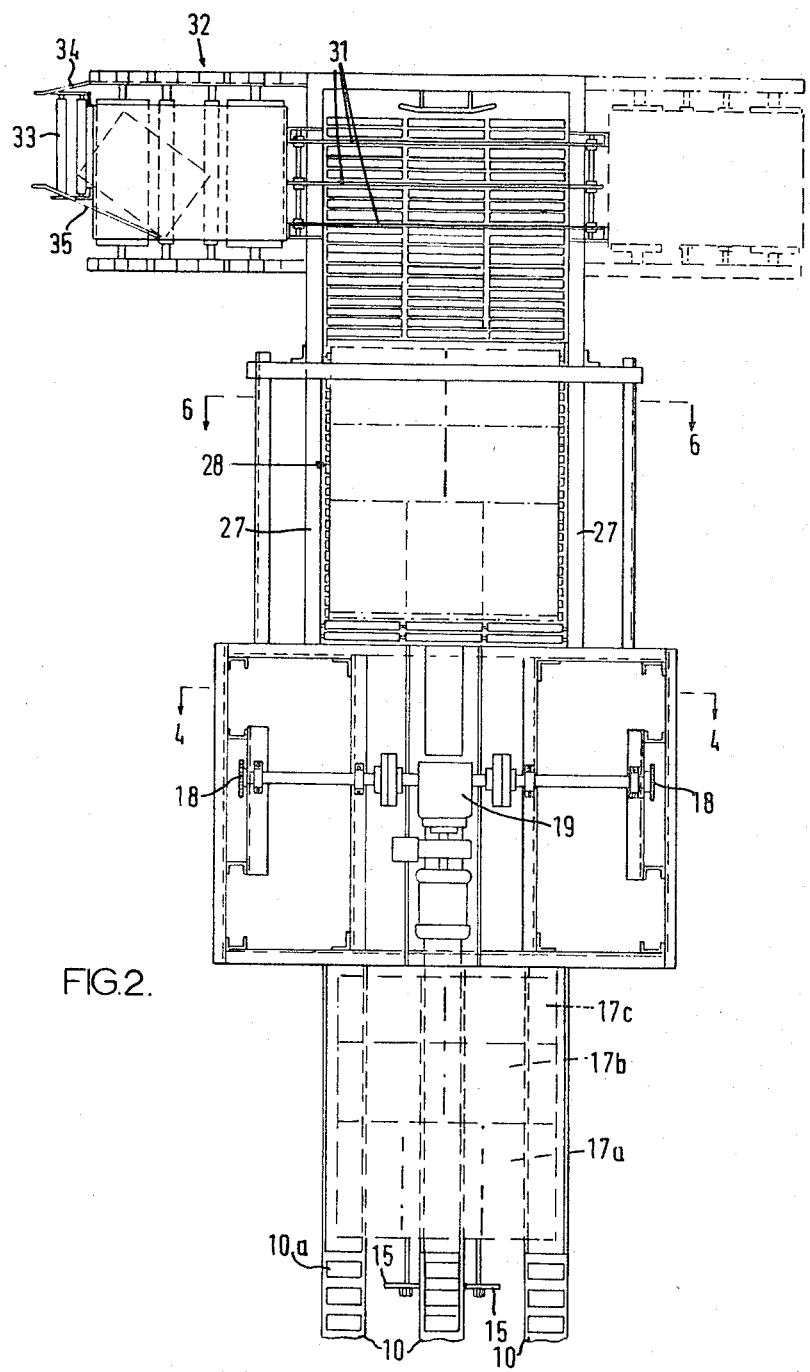
Figure 3:
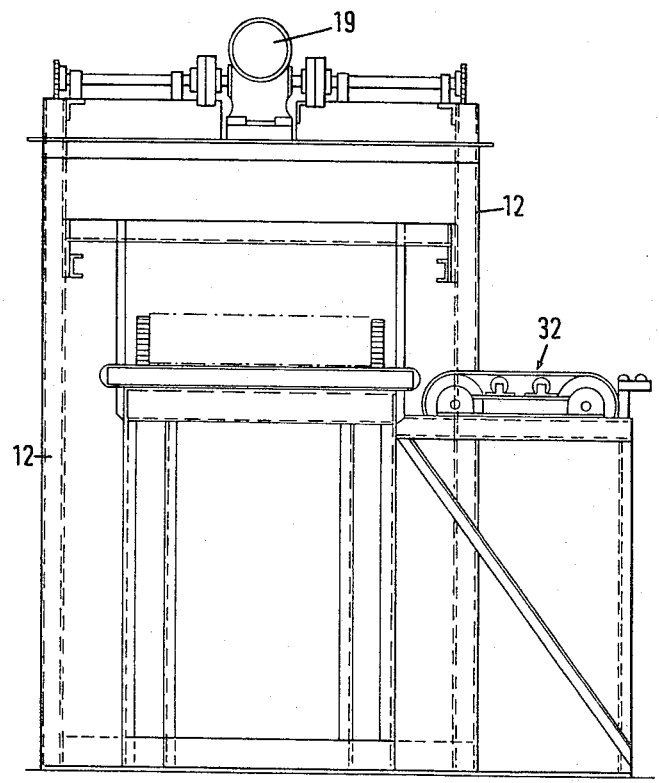
Figure 4:
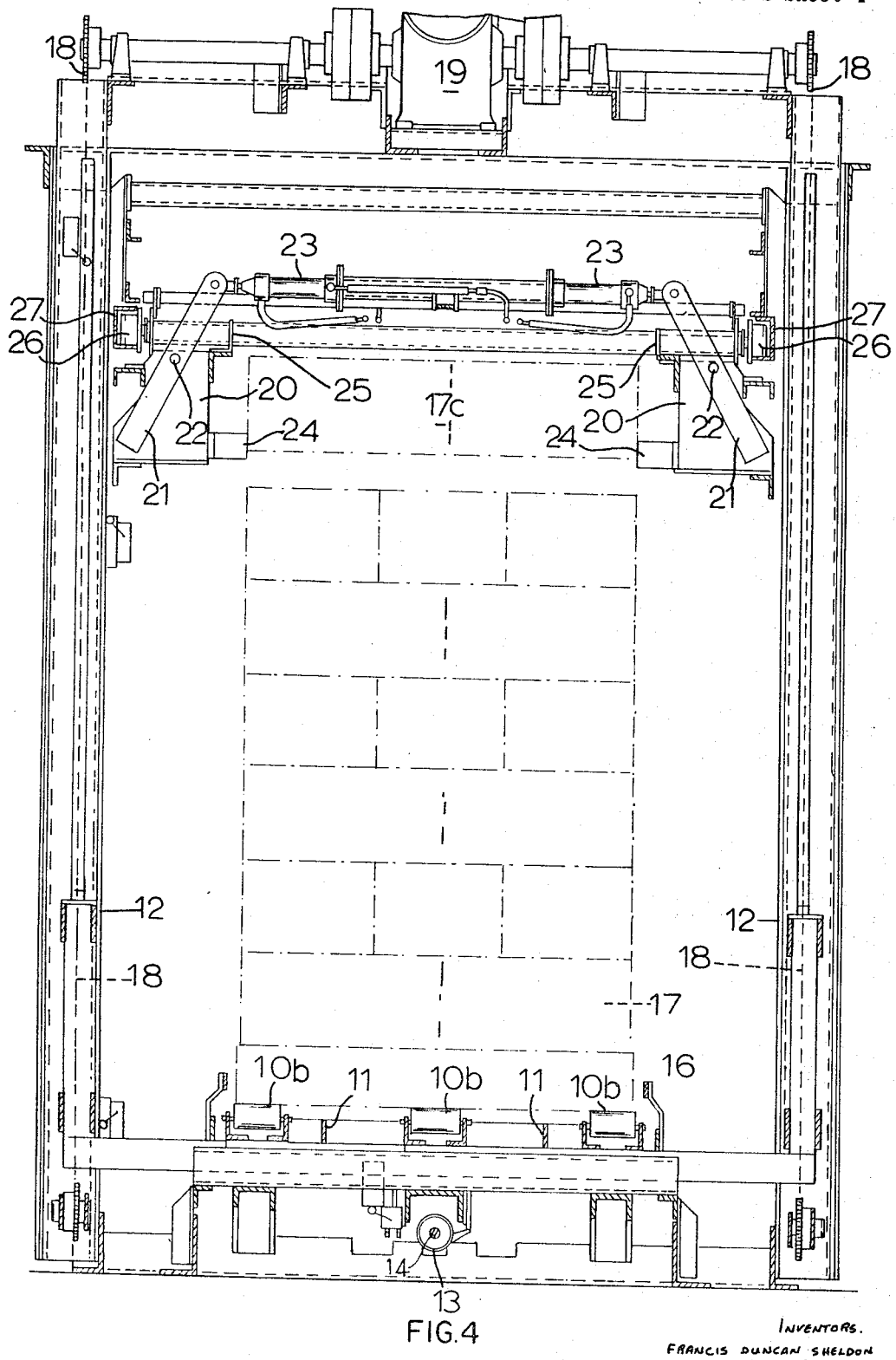
Figure 5:
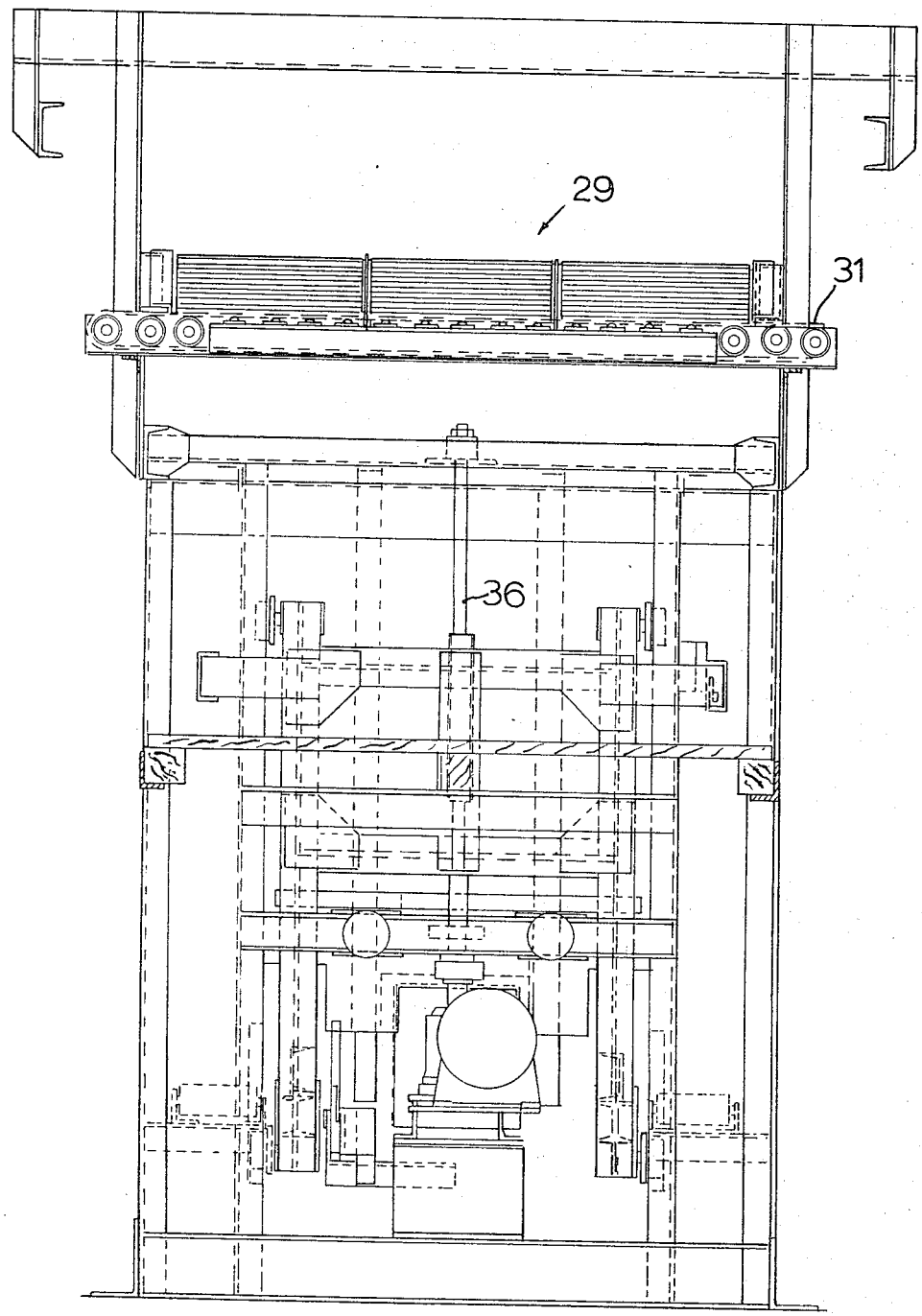
Figure 6:
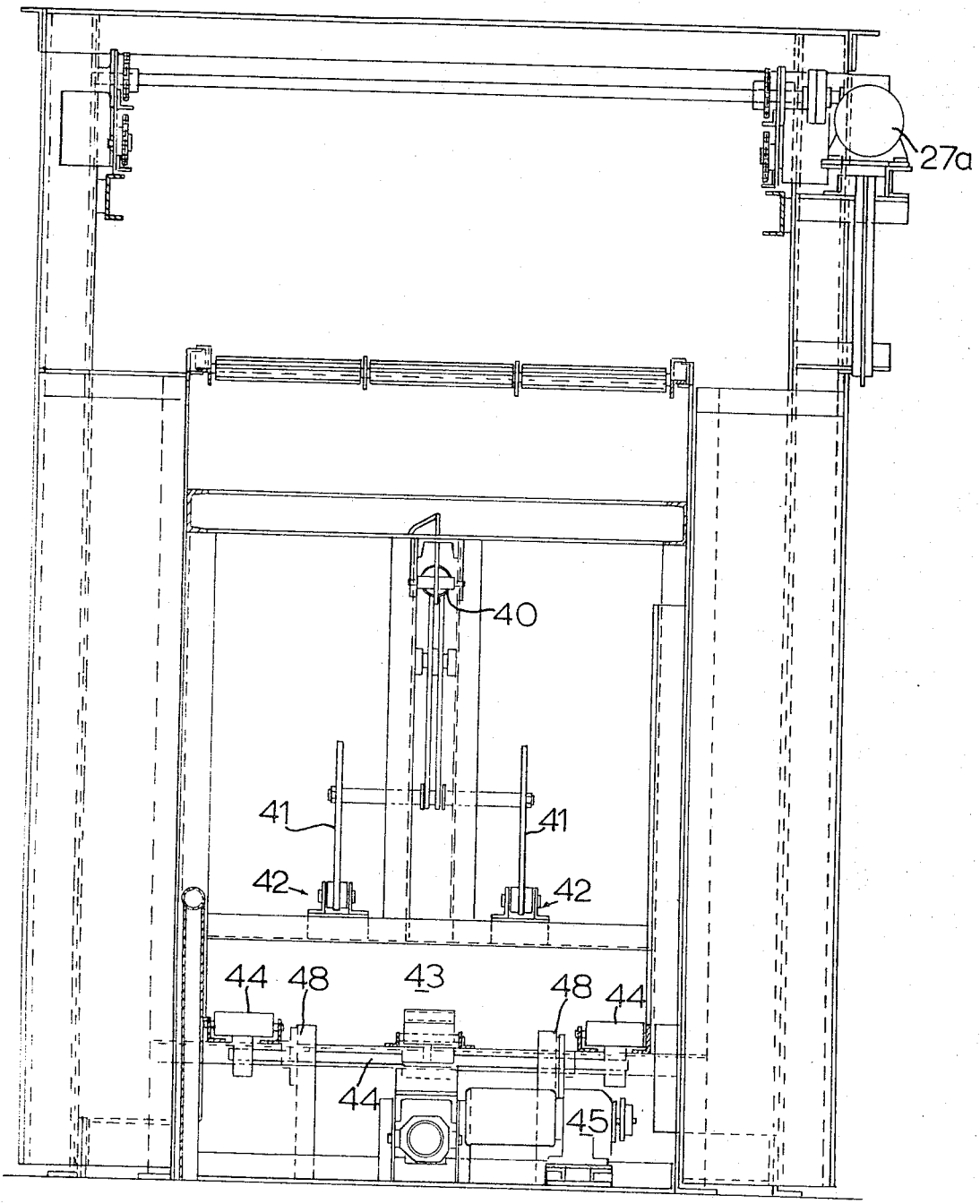

One complete fully automatic machine embodying the present invention will now be described by way of example and with reference to the accompanying drawings, wherein:

FIGURE 1 is side-elevation of the machine;
FIGURE 2 is a plan view of the machine;
FIGURE 3 is an end elevation of the machine;
FIGURE 4 is a section through the machine, taken on the line 4—4 of FIGURE 2 to show the elevator;
FIGURE 5 is a section through the machine, on the line 5—5 of FIGURE 1 to show the discharge arrangements, and
FIGURE 6 is also a section through the magazine on the line 6—6 of FIGURE 2 to show the pallet magazine.

The machine shown in the drawing comprises a plurality of conveyors. A first conveyor 10 is the inlet conveyor which consists of three parallel series of freely rotatable rollers, divided lengthwise into two sections 10a, 10b, see FIGURE 1, one of which 10a is freely accessible to permit a loaded pallet to be deposited thereon by a forklift truck or other means, and the second and subsequent section 10b is disposed over or about an elevator frame 11 in an elevator shaft structure 12. The said first conveyor 10 has an associated pneumatic cylinder 13, FIGURES 1 and 4 of which the ram 14 is coupled to a pusher 15 so that when the cylinder and its associated piston rod are contracted the pusher (sliding between the roller series) displaces a pallet 16 and its load 17 into the elevator shaft.

The elevator frame 11 is carried on a sprocket driven chain 18 (FIGURE 4) powered by a reversible motor 19 with a fixed centre sprocket at the opposite end of the chain run to the motor sprocket and with the frame pinned to the chain. (Alternatively other means may be used, e.g. a screw device). The elevator shaft is provided with guide means to maintain the loaded pallet level and steady when the elevator frame is lifted and lowered, and also with means to centralise an unequally loaded pallet.

The upper end of the elevator shaft houses clamp means (FIGURE 4) comprising a pair of relatively movable abutment sections 20 carried by links 21 pivoted to the abutments at 22 and to a pair of linked pistons and cylinders 23. To accommodate pallet loads with regular shapes, such for example as that shown which comprises (FIGURE 1) a stack of bottle crates rectangular in plan loaded seven crates to a layer, one row 17a of these having longer sides parallel to the first conveyor axis 10 and two rows 17b, 17c of two crates disposed at 90° to the row of three, the movable abutment sections comprise resilient pads 24: for irregular loads the abutments may be in separate parts carried by separate cylinders, or in linked and spring urged parts, or where the load can be standardised, may be specially shaped to suit.

In general the frame is raised to bring the top layer of articles 17d FIGURE 1 within the clamp means which are then actuated to hold the layer whilst the frame is lowered slightly with the pallet and lower layers to the position shown in FIGURE 4.

The clamp means is mounted on a trolley frame 25 having wheels 26 which run on rails 27 (FIGURES 1 and 4) and is reciprocable by a further piston and cylinder, rack and pinion, or like mechanism (not shown) between a position within the elevator framework and a position over the first section 28 of a second conveyor, FIGURE 1.

The second conveyor is a feed conveyor comprising three sections 28, 29, 30. The first section of this conveyor extends away from the elevator shaft and is a gravity roller conveyor. The second section is aligned with the opposite end of the first section and is arranged to be raised and lowered, above and to the level of the first section by further piston and cylinder or other means (not shown).

When the clamped layer of articles is released on to the first section the layer rolls along the first section to the second section of the second conveyor.

The elevator frame is then raised, the new top layer is clamped, the elevator frame lowered, the trolley reciprocated and the clamp released, this cycle being repeated until the pallet is empty when it is lowered to the base of the elevator shaft; a fresh loaded pallet can be then fed into the shaft to start a new unloading cycle, and expel the empty pallet into the pallet magazine.

As the articles pass down the first section 28 of the feed conveyor, they pass on to the second section 29 which is then raised so that its end adjacent the first section rises to act as a stop after one article, or one row of articles have passed on to it. The first articles then pass on to the third and final section 30 of feed conveyor and on to a transversely extending discharge FIGURES 1 and 2 which is a chain conveyor with a plurality of chains 31 located between and parallel to the rollers of section 30 and which feed the row in the direction of its length and feeds to a discharge conveyor: the latter has an accelerating section 32 so that the articles are spaced apart, and a discharge section 33 which carries fenders 34, 35 arranged so that any article 17 is not properly aligned is turned until it is so aligned. Hence, if the third row (containing three crates) of the seven crate layer previously referred to is being fed through the said discharge section, all of the crates are turned till they are aligned with the first four crates which preceded them. The fenders are adjustable to allow for different loads and sizes.

The said third section of the feed conveyor is meshed with the chain conveyor as stated and is mounted on a further cylinder unit 35 FIGURE 5 so that when initially above the discharge conveyor it carries the articles over, i.e. on to the chain conveyor and is then lowered to take the articles into contact with said chain conveyor. Suitable guides 38 (FIGURE 1) are provided to prevent overshooting.

After the final section 30 of the feed conveyor has been lowered the second section 29 of this is also lowered to permit a further article or row of articles to pass to the third and final section, which is raised preparatory to their arrival. This alternate raising and lowering is repeated as long as articles are being fed through the machine.

In a mechanised factory or warehouse, the empty pallets will often be collected in batches and to simplify their handling, the empty pallet discharge rollers discharge the pallets into a pallet magazine.

The pallet magazine (FIGURE 6) has a clamp means located fore and aft of the conveyor 10 and generally similar to these in the elevator shaft, comprising a piston and cylinder mechanism 40, levers 41, and abutments 42 located so that when the lowest pallet 16a (FIGURES 1 and 6) in a stack is clamped, there is a space, generally indicated at 43 FIGURE 6, below that pallet to accommodate a fresh one. The pallet magazine is provided with a powered track 44 to drive (from motor 45) the pallet fed into it to a predetermined position, and elevator forks 48 FIGURE 6 driven by a rack and pinion, lift screw or the like from a reversible motor are provided so that the stack as a whole can be raised, clamped, and then the forks lowered below the track to accommodate the next pallet.

Loads of empty pallets can be removed as desired.

The machine so far described is conveniently made fully automatic and the completion of one part of a cycle of operations initiates the next part.

One complete cycle of operations will now be described for a fully automatic machine handling bottle crates.

Assuming the machine to be empty of pallets and crates, the weight of a loaded pallet 16 placed on the inlet conveyor 10 operates a first limit switch 50 and, via a solenoid 51, reverses the cylinder 13 which pushes the loaded pallet into the elevator shaft. A second switch 52 is reset as the pallet reaches its desired position to stop the cylinder: the cylinder is readied for a repeat cycle by pneumatic valve 53: switch 63 (manually operated in this instance) starts the elevator hoist motor 19 which raises the loaded pallet until a light beam affecting a first photoelectric cell 54 is interrupted to cause the motor to stop and operate the clamp means. After a predetermined delay the hoist motor is reversed and lowers the elevator frame with pallet until a second and lower light beam 56 is reestablished: this actuates the means which displaces the trolley and clamp means to transfer the load out of the elevator shaft. As the said load reaches its extended position switch 57 releases the clamp, and the articles drop onto the conveyor 28: simultaneously or substantially so switch 57 actuates means to return the trolley, the elevator motor is reversed and reenergised and the pallet rises to take near the top surface of the stack of crates to the same level as reached by the original top surface. This part of the cycle involving raising and lowering of the elevator frame, clamping and release, and reciprocation of the trolley, is repeated until the empty pallet is raised against a limit switch 55, when the pallet is lowered, operates a limit switch 61 and stops the elevator motor.

As a new pallet is introduced into the elevator it displaces the old pallet into the pallet magazine and trips switch 62 to start the discharge motor; the switch is reset to stop the motor when the pallet is fully within the magazine. A new unloading cycle is initiated by the arrival of the new pallet. The empty pallet operates switch 63 to operate the elevator motor and also release the pallet magazine clamp and raise the pallet elevator forks: after a delay, the clamp engages the raised empty pallet, and is held on whilst the forks are returned. This part of the cycle is repeated whenever a new empty pallet reaches the magazine until the stack reaches a predetermined height when a warning may be given and/or the whole machine stopped by switch 59.

As the crates travel down the feed conveyor they break a light beam 65 which in known manner actuates solenoid valves: these valves cause the second section of the track to lift immediately (via the cylinder) and allow only the first row of crates to travel on, and simultaneously raise the third section of track, this operates cell 66 to control the lifting and lowering means. As the light beam is reestablished the third section is lowered as previously explained and then the second section. The lowering of the second section to permit the next row of crates to travel on may be controlled by a further switch 67 actuated when the third section is clear of crates.

Switch 50 merely readies the machine for the new pallet load to be pushed into the elevator which is delayed until the elevator is emptied as signalled by switch 62. Cylinder 13 is reversed by the same mechanism.

In this manner, the machine operates automatically and without supervision.

It will also be appreciated that there are many possible variations in order to suit requirements; the variations are not only of the complete machine previously described, but also (where economics render a completely automatic or semi-automatic machine unfeasible) using the first stages only: for example a machine may be push-button operated or may terminate at the stage where the articles have been off-loaded from the pallet on to a gravity conveyor, any necessary alignment of the articles being carried out by an operator manually.

We claim:
1. Mechanical handling equipment for unloading pallets, comprising elevator means for raising and lowering a pallet loaded with a plurality of superimposed layers of articles, means for arresting the elevator means when the uppermost of said layers of articles on the pallet has been raised to a predetermined height, clamping means for clamping said uppermost layer of articles at said predetermined height, a reversing mechanism automatically operable to reactuate the elevator means after a predetermined delay to lower the loaded pallet for a distance less than the stack height and subsequently to raise the loaded pallet to present a new uppermost layer of the stack for a repeat cycle, a delivery conveyor horizontally spaced from the elevator means, a carriage supporting said clamping means at a fixed distance therebelow and reciprocable to carry the clamped uppermost layer to the delivery conveyor for release thereon, a fixed track extending from above the elevator means to above the discharge conveyor, said carriage being supported on said track, and means for reciprocating the carriage along the track.

2. Mechanical handling equipment as claimed in claim 1, comprising a feed conveyor extending into said elevator means and having a plurality of parallel series of conveyor rollers, a pusher located between said series for moving the pallet on the feed conveyor, and a piston and cylinder for actuating the pusher.

3. Mechanical handling equipment as claimed in claim 1, further comprising a pallet magazine, transferring means for transferring an unloaded pallet into the pallet magazine, lifting means for elevating the unloaded pallet in the magazine, and means for clamping the lowermost of a stack of elevated unloaded pallets in the magazine.

4. Mechanical handling equipment as claimed in claim 1, wherein the discharge conveyor comprises a plurality of sections, at least one of said sections being adapted to be raised to constitute a barrier to articles travelling along the preceding section.

5. Mechanical handling equipment for unloading a pallet which is loaded with a plurality of superimposed layers of articles, each of said layers comprising a plurality of articles side-by-side across the width of the pallet and a plurality of articles end-to-end along the length of the pallet, comprising:
  (i) a feed conveyor;
  (ii) an elevator srtucture;
    (a) said feed conveyor extending into the elevator structure for conveying the loaded pallet therein;
  (iii) an elevator fork, disposed below said feed conveyor and within said elevator structure;
  (iv) hoist means connected to said elevator fork for raising the latter through the level of the feed conveyor and engaging with and elevating the loaded pallet;
  (v) a delivery conveyor extending from the elevator structure and disposed at a level near the top of said structure;
  (vi) a fixed track extending within said elevator structure and overlying said delivery conveyor;
  (vii) a carriage supported on said track and movable therealong;
  (viii) means for reciprocating the carriage on the tracks;
  (ix) clamping means carried at a fixed distance below and by said carriage and movable therewith;
    (a) said clamping means comprising a pair of spaced abutments movable towards and away from one another;
    (b) said abutments, in their widest spaced apart position being located upon opposite sides of the loaded pallet, and
    (c) said abutments being of a length substantially equal to the length of the loaded pallet;
    (d) so that an entire layer of articles may be clamped and suspended when the abutments are moved together;
  (e) and means for moving said abutments together or apart;
  (x) a control means for causing the hoist means to stop when the uppermost layer of articles reaches a position at the level of the clamping means, for causing the abutment moving means to actuate the abutments to clamp said uppermost layer of articles, for causing the carriage to move from within the elevator structure to the opposite end of the track, for actuating the abutment moving means to separate the abutments and deposit the whole layer on the delivery conveyor, and for causing the carriage to return to within the elevator, meanwhile causing the loaded pallet with the other layer of articles to be lowered for a distance less than the stack height and subsequently re-raised to present a new uppermost layer for a repeat cycle.

6. Mechanical handling equipment as claimed in claim 5, wherein:
  (i) said means for moving said abutments together or apart comprises:
    (a) a piston and cylinder, and
    (b) a pair of levers each having a fixed pivot and being connected one to each end of the piston and cylinder,
    (c) said piston and cylinder being supported via said fixed pivots of said levers, and
  (ii) said abutments comprise pads to contact the upper layer of articles, the pads being carried by the levers, so that said piston and cylinder can float to accommodate variation in the lateral position of the upper layer of articles.

7. Mechanical handling equipment as claimed in claim 5, wherein the control means comprises:
  (i) a first photocell operable by the elevated loaded pallet
    (a) to cause the hoist means to stop when the uppermost layer of articles reaches a position at the level of the clamping means, and
    (b) to cause the abutment moving means to actuate the abutments to clamp said uppermost layer of articles;
  (ii) a reversing mechanism in the hoist means to actuate the latter to lower the elevator fork after a predetermined delay;
  (iii) a second photocell operable by the loaded pallet
    (a) to cause the hoist means to stop when the elevator fork has been lowered through a predetermined height, and
    (b) to cause the carriage to move from within the elevator structure to the opposite end of the track, and
  (iv) switch means disposed at said opposite end of the track for actuation by the carriage
    (a) to cause the abutment moving means to separate the abutments and deposit the whole layer of articles on the delivery conveyors,
    (b) to cause the carriage to move back to the position within the elevator structure, and
    (c) to cause the hoist means to raise the elevator fork to present a new uppermost layer for a repeat cycle.

References Cited

UNITED STATES PATENTS

| | | | |
|---|---|---|---|
| 2,769,570 | 11/1956 | Adams. | |
| 2,822,933 | 2/1958 | Pagdin | 214—8.5 |
| 3,101,851 | 8/1963 | Heide et al. | 214—6 |
| 3,206,041 | 9/1965 | McGrath | 214—8.5 |

FOREIGN PATENTS 1,209,293  9/1959  France.

GERALD M. FORLENZA, *Primary Examiner.*

MARVIN A. CHAMPION, *Examiner.*

J. E. OLDS, *Assistant Examiner.*